(12) United States Patent
Aksyuk et al.

(10) Patent No.: US 6,175,443 B1
(45) Date of Patent: Jan. 16, 2001

(54) ARTICLE COMPRISING A DEFORMABLE SEGMENTED MIRROR

(75) Inventors: Vladimir A. Aksyuk, Piscataway; Bradley Paul Barber, Chatham; David J. Bishop, Summit; Peter L. Gammel, Millburn; C. Randy Giles, Whippany, all of NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/301,680

(22) Filed: May 1, 1999

(51) Int. Cl.[7] .................................................. G02B 26/00
(52) U.S. Cl. ............................................ 359/291; 359/290
(58) Field of Search ..................................... 359/290, 291, 359/223, 224

(56) References Cited

U.S. PATENT DOCUMENTS 5,016,997 * 5/1991 Bliss et al. ............................ 350/607
5,844,711 * 12/1998 Long, Jr. ............................... 359/290

OTHER PUBLICATIONS

Y. A. Peter, E. Rochat, and H.P. Herzig; Micro–Opto–Mechanical Systems: Application in Pulsed Fiber Lasers and Optical switching; in Microelectronic Structures and MEMS for Optical Processing III, Proceedings of SPIE, vol. 3236, pp. 102–111 (1997/best available date).*

* cited by examiner

Primary Examiner—Georgia Epps
Assistant Examiner—David N. Spector
(74) Attorney, Agent, or Firm—DeMont & Breyer; Wayne S. Breyer; Jason Paul DeMont

(57) ABSTRACT

An article for directing optical signals among optical waveguides is disclosed. The article comprises a plurality of mirror elements that are mechanically and electrically interconnected to form a reflective surface. The reflective surface is deformable upon application of a voltage. Optical signals delivered from a source waveguide may be directed to different destination waveguides as the reflective surface is deformed. The plurality of mirror elements is actuated by a single actuator.

14 Claims, 7 Drawing Sheets

ARTICLE COMPRISING A DEFORMABLE SEGMENTED MIRROR

FIELD OF THE INVENTION

The present invention relates generally to adaptive optics. More particulary, the present invention relates to electrically-controlled deformable mirrors.

BACKGROUND OF THE INVENTION

Electrically-controlled, micro-machined "mirrors" can be used to alter the path of an optical signal. Such mirrors are usually implemented as metallized layer of polysilicon or as a dielectric stack. Among other applications, such mirrors can be used to create reconfigurable optical networks wherein one or more optical signals from one or more source fibers are directed to any one of several destination fibers via operation of the mirror. Such an arrangement, wherein an optical element (e.g., a mirror) is adjusted, typically in response to a sensed condition, is commonly referred to as "adaptive optics."

In one conventional adaptive optics arrangement, a reflective layer having a uniform thickness is suspended above an electrode. As a voltage is applied across the reflective layer and the electrode (hereinafter "actuation"), the reflective layer deforms. An optical signal incident on the reflective layer is directed to a different destination on reflection as a function of the deformed or undeformed shape of the reflective layer.

A simplified schematic of such an arrangement is depicted FIG. 1, wherein reflective layer or mirror 102 is suspended, via supports 104, over electrode 106. Both mirror 102 and electrode 106 are substantially parallel to substrate surface 108. Optical fibers 110, 112 and 114 are in optical communication with mirror 102.

In the arrangement depicted in FIG. 1, the path that an optical signal follows upon reflection from mirror 102 is dictated by the shape of the mirror. That relationship is illustrated in FIGS. 2a and 2b. In FIGS. 2a and 2b, optical fibers 110 and 112 deliver respective optical signals 116 and 118 to mirror 102. When the mirror is undeformed such that it has a flat form, as depicted in FIG. 2a, optical signals 116 and 118 delivered to mirror 102 from respective optical fibers 110 and 112 are returned to those optical fibers upon reflection. On the other hand, when mirror 102 is deformed such that it has a curved form, as depicted in FIG. 2b, optical signals 116 and 118 delivered to the mirror are reflected to optical fiber 114, rather than to the source fibers 110 and 112.

Mirror 102 is deformed by applying a voltage across the mirror and electrode 106. The applied voltage generates an electrostatic force that causes mirror 102 to move towards electrode 106. Since the ends of mirror 102 are immobilized, the mirror deforms in a characteristically parabolic shape. When the voltage is removed, the electrostatic force diminishes, and mirror 102 substantially returns to its flat, undeformed shape.

As is clear from the foregoing description of the arrangement depicted in FIG. 1, the path that an optical signal follows upon reflection from mirror 102 is dictated by the shape of the mirror. And, the shape of mirror 102 depends upon the mechanical response of the uniform-thickness reflective layer serving as the mirror. Thus, the optical and mechanical response or properties of the mirror are disadvantageously coupled (i.e., they are not independent of one another). Moreover, the mechanical response of such a uniform layer is difficult to precisely control. In view of the extremely severe tolerances required for directing optical signals among fibers, particularly single-mode fibers (ie., about 1 micron tolerance), the utility of such a device is limited.

A second conventional adaptive optics arrangement is a mirror array comprising a plurality of individually-controlled discrete mirror elements. The optical behavior of the mirror array is dictated by its surface features, which is a function of the state (e.g., orientation, shape, etc.) of the plurality of individual mirror elements comprising the array. Thus, by individually controlling the mirror elements through the action their associated actuators, the surface features of the array can be varied to obtain a desired optical response.

A variety of actuators can be used in such an arrangement. One type of actuator is depicted in FIG. 3, which shows a single mirror element 322 connected to actuator 326.

Actuator 326 is operable to tilt mirror element 322. In particular, support members 340 and torsion members 342 suspend mirror element 322 above substrate surface 328. Electrodes 344a and 344b are individually and separately charged (voltage source not shown) to attract mirror element 322. Torsion members 342 allow mirror element 322 to move through an angle, ±θ. The position of mirror element 322 depends upon which of electrodes 344a or 344b is charged at a given moment. An optical signal (not shown) that is received by mirror element 322 is reflected to a different destination as a function of the tilt of that mirror element.

The aforedescribed mirror array substantially avoids the problematic coupled optical/mechanical response characteristic of the first arrangement. But, in avoiding that problem, other problems result. In particular, in the prior art mirror array, an actuator is required for each element of the array. The multiplicity of actuators in such an array significantly adds to its complexity and cost.

The art would thus benefit from adaptive optics in the form of a micro-machined mirror that avoids the optical/mechanical interdependence of the uniform reflective layer, and also avoids the multiple actuators of the conventional mirror array.

SUMMARY OF THE INVENTION

An article comprising a segmented reflective layer operable to alter the path of optical signals is disclosed. The segmented reflective layer comprises a plurality of mirror elements that are mechanically and electrically linked to one another and controlled via a single actuator.

In a "quiescent" (i.e., unactuated) state, the reflective layer typically assumes a flat shape. Upon actuation, such as may be caused by applying a voltage across the mirror elements and a nearby fixed electrode, the mirror elements move towards the electrode to a greater or lesser degree, thereby deforming the reflective layer. In the "actuated" state, the reflective layer assumes a characteristically concave-upward shape (relative to optically communicating optical fibers). The change in shape of the reflective layer is used to alter the path of optical signals incident thereon.

Each mirror element is advantageously mechanically and electrically linked to an adjacent mirror element via a resilient, electrically-conductive linking member. During actuation, the linking members deform rather than the mirror elements. Upon such deformation, the linking members store energy. When the actuating force is removed, the linking members release the stored energy, the reflective layer is restored to a substantially flat form.

In some embodiments, the mechanical response of the linking members is isotropic; in other embodiments, the mechanical response of the linking members are directionally or regionally varied. As such, the reflective layer can be designed to assume virtually any shape upon deformation.

By virtue of its structure, the present invention provides an article that advantageously avoids the drawbacks of conventional adaptive optics devices. In particular, since it is the linking members rather than the mirror elements that deform on actuation, the optical behavior and the mechanical behavior of the reflective layer are decoupled. And, since the individual mirror elements comprising the reflective layer are mechanically linked to one another, only a single actuator is required for deforming the reflective layer.

DETAILED DESCRIPTION

In some embodiments, the present invention provides an article suitable for directing optical signals to selected optical waveguides. Such a device is useful in conjunction with a variety of optical systems, including, without limitation, packet routers, add-drop multiplexers and reconfigurable networks, to name but a few such systems.

Figure 1:
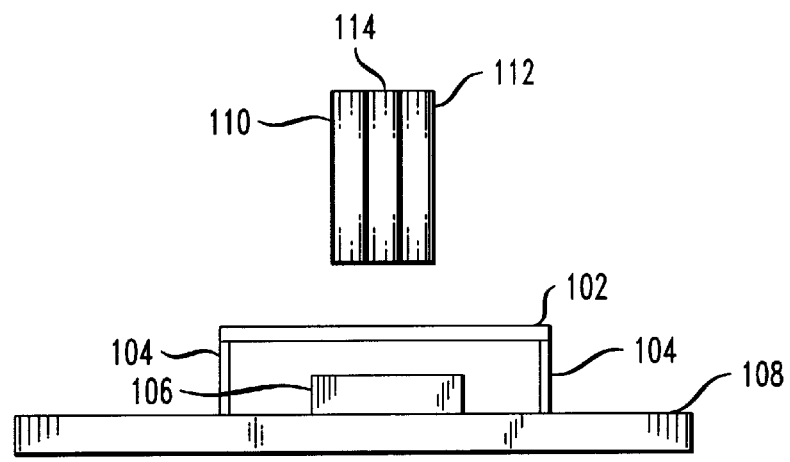
FIG. 1 depicts a first conventional arrangement for adaptive optics that utilizes a reflective layer.
Figure 2A:
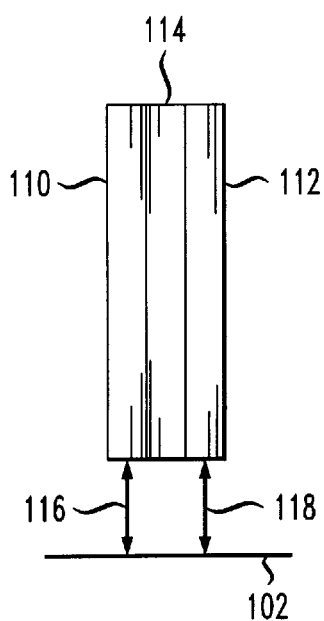
FIG. 2A depicts the reflective layer of the arrangement of FIG. 1 in an undeformed, quiescent state.
Figure 2B:
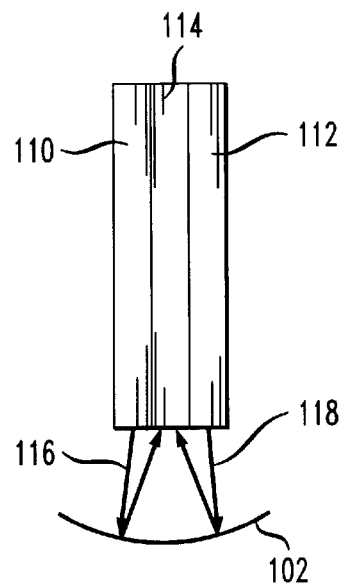
FIG. 2B depicts the reflective layer of the arrangement of FIG. 1 in a deformed, actuated state.
Figure 3:
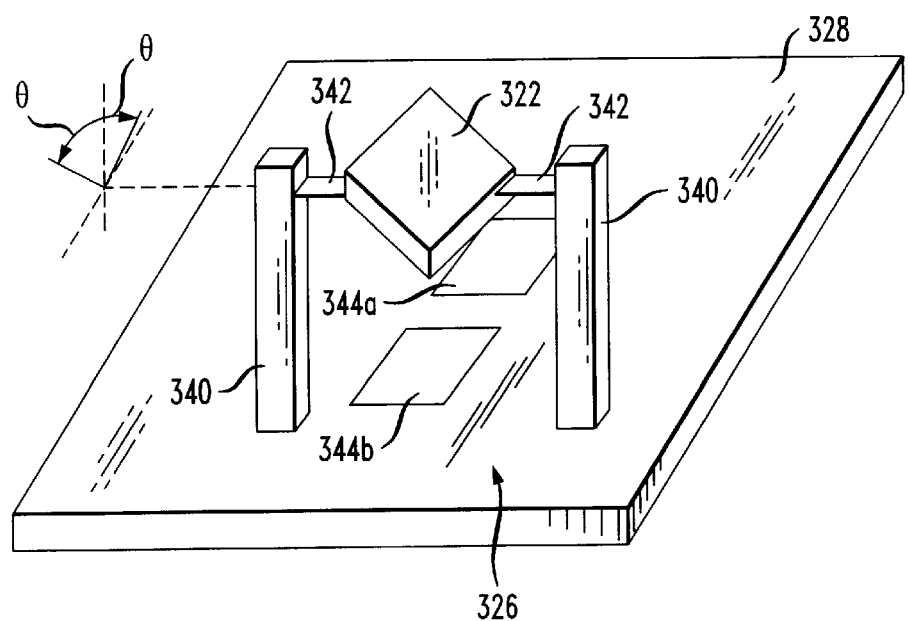
FIG. 3 depicts an actuator for use in conjunction with a second conventional arrangement for adaptive optics that comprises a plurality of individually-actuated mirror elements.
Figure 4A:
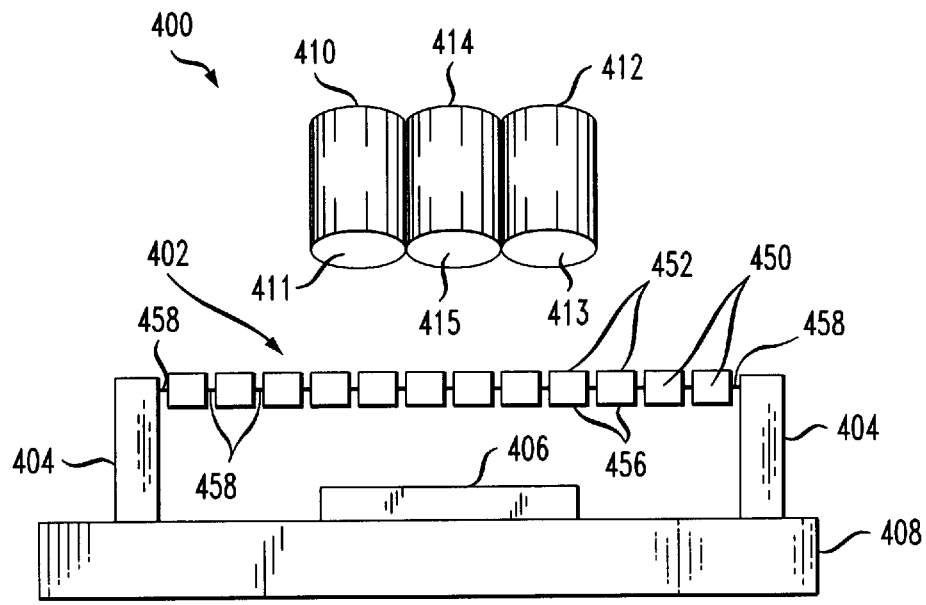
FIG. 4A depicts a first article having a reflective layer in accordance with the illustrative embodiment of the present invention.

FIG. 4A depicts an article 400 in accordance with an illustrative embodiment of the present invention. Article 400 consists of a reflective layer 402 comprising a plurality of lined mirror elements 450 that are suspended above a support or substrate 408 by support members 404. Mirror elements 450 are mechanically linked via resilient and advantageously electrically-conductive linking members 458. Such linking members 458 also join mirror elements 450 to support elements 404.

Each mirror element 450 has a reflective surface 452. In one embodiment, reflective surface 452 is realized as a layer of metal disposed on the mirror element. In other embodiments, reflective surface 452 is a dielectric mirror, dielectric filter, polarizer, modulator, attenuator or the like. In such other embodiments, the dielectric mirror, etc., can be disposed on mirror element 450, or, alternatively, the mirror element and reflective surface can be one in the same (ie., the dielectric mirror is the mirror element). Linked mirror elements 450 are advantageously arranged such that reflective surface 452 of each mirror element is oriented in substantially the same direction when article 400a is in a quiescent state.

Each mirror element 450 is advantageously at least partially conductive. In the embodiment depicted in FIG. 4A, such conductivity is imparted by providing a conductive surface 456, such as a layer of doped polysilicon or other conductive material, on each mirror element 450. Conductive surface 456 is disposed on a side of mirror element 450 opposite that of reflective surface 452. In other embodiments, mirror elements 450 are wholly formed from a conductive material, or a material that can be rendered conductive by appropriate doping. Support members 404 and linking members 458 are advantageously conductive, or contain conductive material, so that mirror elements 450 are electrically connected to one another.

In the embodiment depicted in FIG. 4A, a fixed electrode 406 is disposed between substrate 408 and mirror elements 450. Fixed electrode 406 can be fabricated from doped polysilicon or other conductive material. In other embodiments, rather than utilizing a discretely implemented electrode (i.e., a layer of deposited material), substrate 408 is suitably doped to render an appropriate region thereof conductive to function as said fixed electrode 406.

Figure 4B:
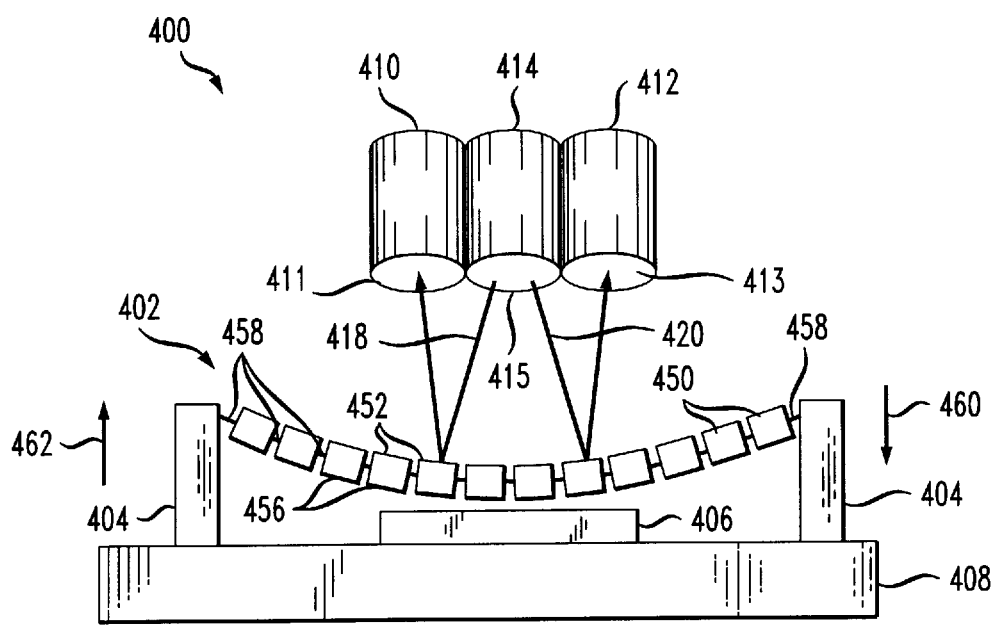
FIG. 4B depicts the reflective layer of the article of FIG. 4A in a deformed state.

Fixed electrode 406, and conductive surface 456 of each mirror element 450, are in electrical contact with a controlled voltage source (not shown). The controlled voltage source is operable to apply a voltage across fixed electrode 406 and conductive mirror elements 450. In the absence of applied voltage, the mirror elements, and hence reflective layer 402, are in a quiescent state. In such a state, reflective layer 402 has a substantially flat shape, as is depicted in FIG. 4A. When a voltage is applied across fixed electrode 406 and conductive mirror elements 450, an electrostatic attraction is developed therebetween. Such a force causes mirror elements 450, and hence reflective layer 402, to move downwardly towards fixed electrode 406, as indicated by vector 460. As depicted in FIG. 4B, reflective layer 402 assumes a "concave upward" shape, relative to the waveguides, as a result of its movement towards fixed electrode 406.

Optical waveguides 410, 412 and 414 are disposed above substrate 408 (waveguide supports not shown). Ends 411, 413 and 415 of respective waveguides 410, 412 and 414 are optically aligned with at least some of mirror elements 450, and face reflective surface 452 thereof. As illustrated by ray tracings in FIG. 4B, when reflective layer 402 is biased in a concave-upward shape, optical signal 418 incident thereon, delivered from waveguide 414, is delivered to waveguide 410. Similarly, optical signal 420, also delivered from waveguide 414, is delivered to waveguide 412.

During actuation, linking members 458 that link mirror elements 450 are deformed as the mirror elements are drawn toward electrode 406. Upon deformation, the linking members 458 store energy. When the actuating force (e.g., applied voltage) is removed, linking members 458 release the stored energy, whereby mirror elements 450, and hence reflective layer 402, are restored, as indicated by vector 462 (FIG. 4B), to the quiescent state and a substantially flat shape. It will be appreciated that when reflective layer 402 is quiescent as depicted in FIG. 4A, optical signals originating from waveguide 414, after striking reflective layer 402, are directed back to waveguide 414.

Figure 5:
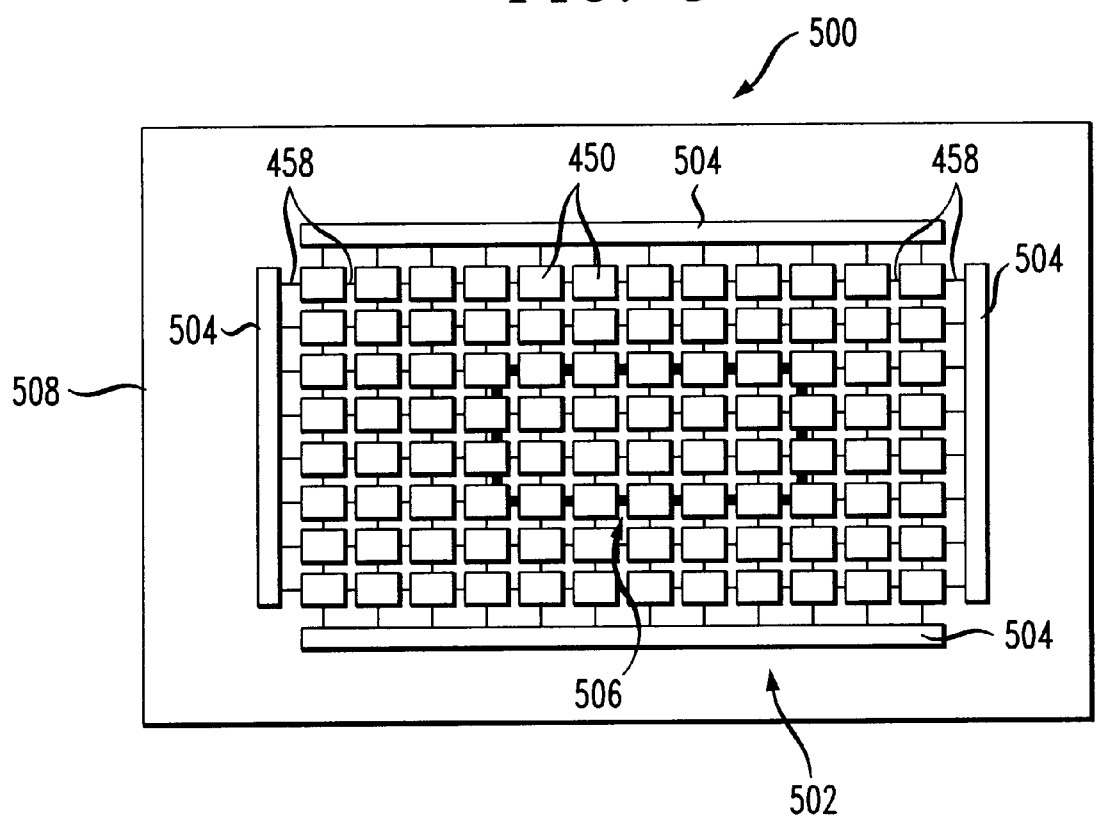
FIG. 5 depicts a second article having a reflective layer in accordance with the illustrative embodiment of the present invention.

In the previously described embodiments, reflective layer 402 was depicted as a 1×N array of mirror elements 450. In other embodiments, such as the one depicted in FIG. 5, an article 500 in accordance with the present teachings has a reflective layer 502 comprising an M×N array of mirror elements 450. Adjacent mirror elements 450 are linked via linking members 458. And, terminal mirror elements 450 are linked, via linking members 458, to support elements 504. An electrode 506 is disposed beneath reflective layer 402.

In the illustrated embodiment, support elements 504 are present at each side of reflective layer 502. In other embodiments, support elements 504 are present on only two (opposed) sides of the reflective layer. Also, while reflective layer 502 is depicted as having a rectangular shape, it should be understood that in other embodiments, it may have a different shape, such as, for example, a square, circular, oval or other shape.

Individual mirror elements 450 are advantageously fabricated into a square shape. When arranged into an array, square-shaped mirror elements provide a reflective layer having a relatively small amount of void (and non-reflective) area. In applications wherein the relative proportion of void space is inconsequential, mirror elements having circular, oval or other shapes may suitably be used.

Figure 6:
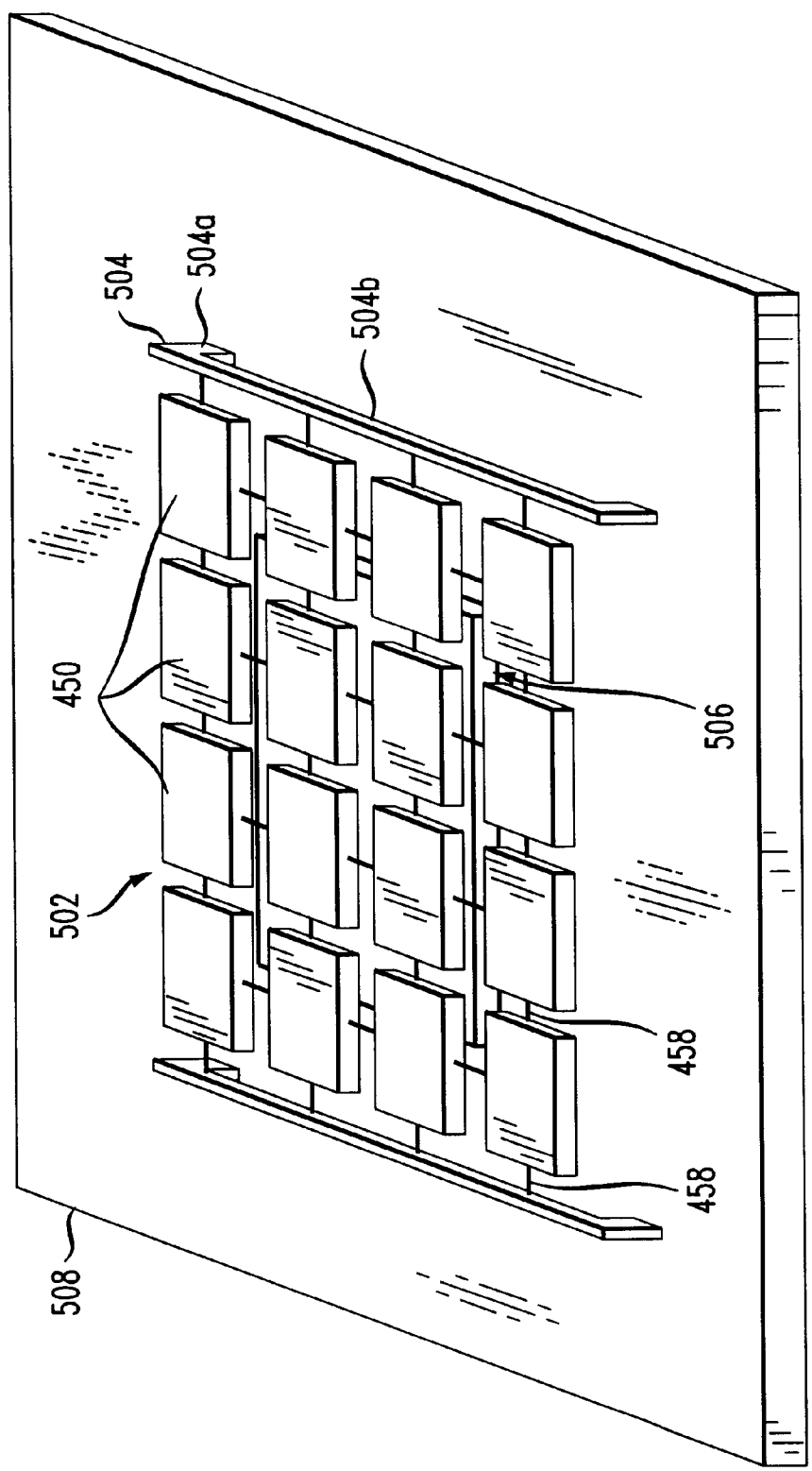
FIG. 6 depicts a perspective view of the article of FIG. 5.

FIG. 6 depicts a perspective view of a smaller version of article 500. Article 500 includes reflective layer 502, which is supported on two sides (four sides in other embodiments) by support elements 504. Reflective layer 502 comprises an array of mirror elements 450 that are mechanically and electrically linked via linking members 458. Each support element 504 includes uprights 504a and cross member 504b. Linking members 458 depending from each cross member 504b suspend mirror elements 450, and hence reflective layer 502, above electrode 506 that is disposed on, or formed within, substrate 508.

When actuated, such as by the application of a voltage across electrode 506 and reflective layer 502, the reflective layer deflects towards electrode 506. It will be appreciated that the shape of reflective layer 502 under actuation will be different as a function of whether it is supported by two or four support elements 504.

In one embodiment, the mechanical response of reflective layer 502 is isotropic (i.e., invariant as a function of direction). In such an embodiment, the "stiffness" or mechanical behavior of each linking member 458 in the reflective layer 502 is substantially identical, and the array is typically supported on four sides by support elements 504. In other embodiments, reflective layer 502 is anisotropic. In still other embodiments, the stiffness of linking members 458 is regionally varied, or varied in some other desired manner to achieve a specific mechanical response.

Figure 7:
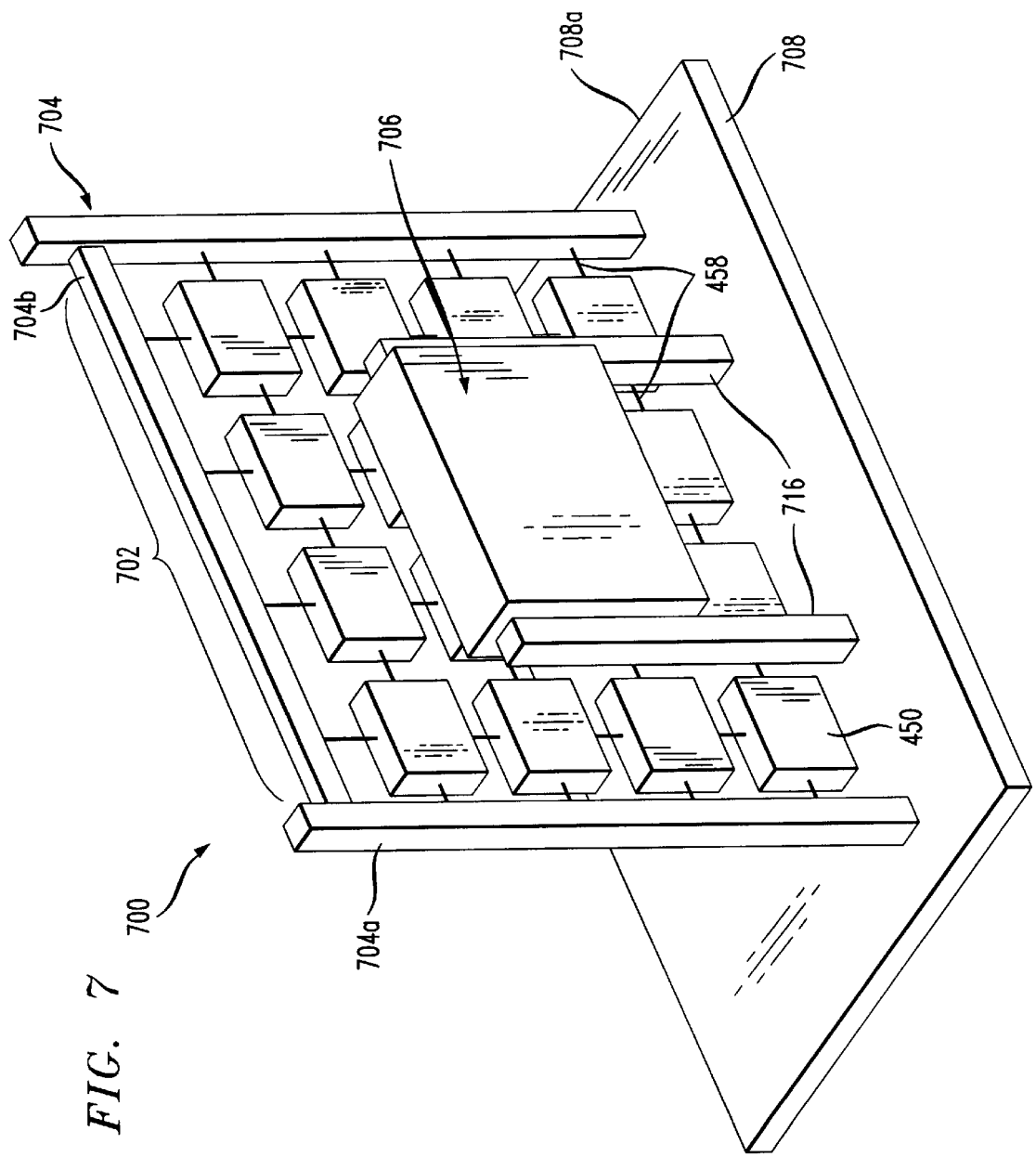
FIG. 7 depicts a third article in accordance with the illustrative embodiment of the present invention.

FIG. 7 depicts a perspective view of an article 700 in accordance with the present teachings. Unlike article 500, reflective layer 702 of article 700, when in the quiescent state, is not substantially parallel to the surface 708a. In fact, in article 700, the reflective surface of reflective layer 702 (ie., the reflective surface 452 of the individual mirror elements 450 comprising layer 702) is substantially orthogonal to substrate surface 708a. It should be appreciated that in other embodiments, reflective layer 702 can be at disposed at an obtuse angle to surface 708a of substrate 708.

In the illustrative embodiment depicted in FIG. 7, reflective layer 702 is suspended from uprights 704a and cross member 704b of support element 704. In another embodiment, a fourth cross member (not shown) is attached to the row of mirror elements 450 disposed proximal to substrate surface 708a. As in previous embodiments, linking members 458 advantageously provide mechanical and electrical interconnection between mirror elements 450. Fixed electrode 706 is suitably spaced from reflective layer 702 and suitably elevated via electrode supports 716. The electrode supports may be fixed in place via locking members fabricated from hinged plates, such as those referenced below.

Figure 8:
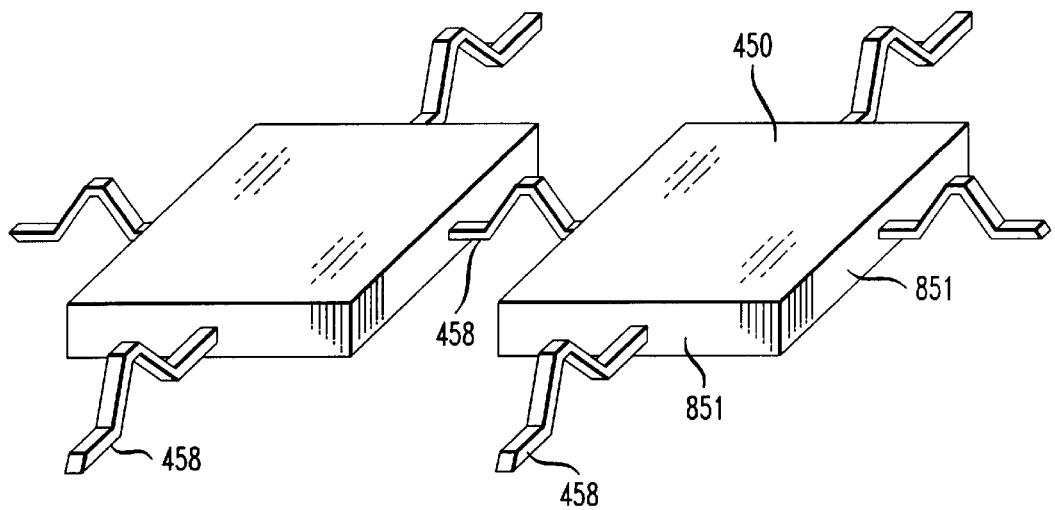
FIG. 8 depicts illustrative linking members for electrically and mechanically connecting adjacent mirror elements.

FIG. 8 depicts a schematic drawing of an illustrative embodiment of linking members 458. As previously described, linking members 458 interconnect adjacent mirror elements 450, placing them in near-abutting relationship.

Figure 9A:
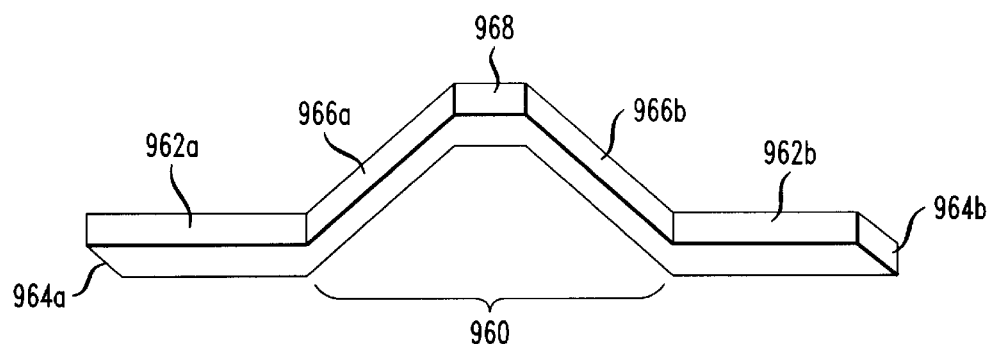
FIG. 9A depicts a first position of the illustrative linking member of FIG. 8.

As depicted in greater detail in FIG. 9A, each linking member 458 consists of a V-shaped portion 960 and side members 962a and 962b, interconnected as shown. V-shaped portion 960 consists of arms 966a and 966b and connecting arm 968. One end of arm 966a depends from a first end of connecting arm 968, and the other end of arm 966a depends from side member 962a. Similarly, one end of arm 966b depends from a second end of connecting arm 968, and the other end of arm 966b depends from side member 962b. Ends 964a and 964b of respective side members 962a and 962b depend either from sides 851 of mirror elements 450 or from supporting structures (e.g., cross member 504b (FIG. 6), cross member 704b or upright 704a (FIG. 7)).

Figure 9B:
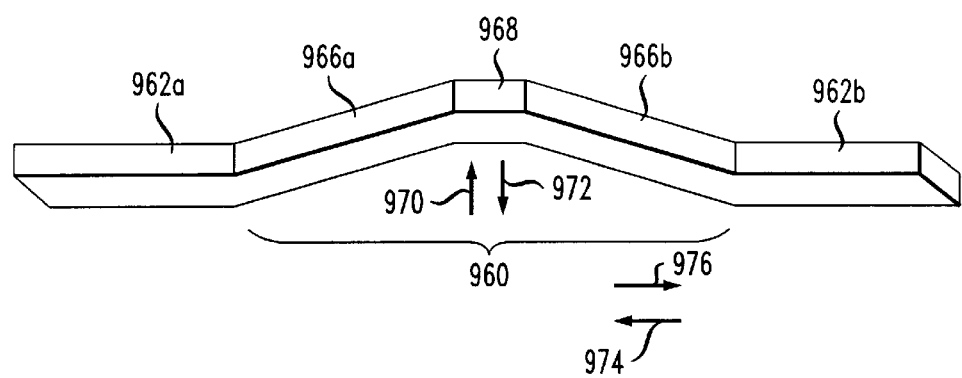
FIG. 9B depicts a second position of the illustrative linking member of FIG. 8.

When mirror elements 450 move in response to an actuating force, linking members 458 deform as depicted in FIG. 9B. V-shaped portion 960 "opens" as connecting arm 968 moves downwardly along vector 972 and as side members 962a and 962b move away from one another in the directions indicated by respective vectors 974 and 976. Energy is stored as V-shaped portion 960 is "opened" upon actuation.

When actuation forces diminished, the V-shaped portion 960 "closes," whereby linking member 458 is returned to its quiescent state and shape (depicted in FIG. 9A) with the release of the stored energy. Closure of the v-shaped portion 960 of linking elements 450 provides a restoring force that returns the reflective layer to a flat shape characteristic of the quiescent state.

It should be understood that in other embodiments, other elements capable of providing a restoring force for mirror elements 450 may suitably be used. Such other arrangements include, for example, spring mechanisms or coils.

The illustrated embodiments of the present invention can be fabricated using surface micromachining technology available from a variety of sources, such as, for example, the MEMS Microelectronics Center of North Carolina (MCNC). One of the technologies offered by MCNC is a three-polysilicon-layer surface micromachining process. The first of the three polysilicon layers, referred to as "POLY0," is non-releasable and is used for patterning address electrodes and local wiring on a substrate, such as a silicon wafer. The other two polysilicon layers, referred to as "POLY1" and "POLY2," are releasable and so can be used to form mechanical structures (e.g., the supports and mirror elements). Such release is achieved by etching away sacrificial oxide layers deposited between the polysilicon layers during fabrication.

The polysilicon layers POLY0, POLY1 and POLY2 have nominal thicknesses of 0.5, 2.0 and 1.5 microns, respectively. The polysilicon and oxide layers are individually patterned, and unwanted material from each layer is removed by reactive ion etching before the next layer is added. Optionally, a layer of metal, nominally 0.6 microns in thickness, may be deposited on the POLY2 layer.

As regards the illustrated embodiments, the POLY1 and/or POLY2 layers can be used to form the various supports structures, resilient members and mirror elements. The polysilicon can be rendered doped, as required, to provide a suitable electrical conductivity. The various structures are patterned using appropriate masks. The optional metal layer can be used to form reflective surface 456 of each mirror elements 450.

To fabricate article 700 depicted in FIG. 7, wherein the reflective layer is disposed out-of-plane relative to the substrate, a variety of hinged plates of differing size and shape are advantageously used. Such hinged plates allow the various structures (e.g., supports, mirror elements, resilient members) of article 700 to be formed such that they are disposed in a plane that is substantially parallel to the surface of the substrate. In other words, the various structures comprising the article are lying on the substrate as formed. In a final assembly step, a free end of such structures is lifted such that the structure rotates about its hinge away from the substrate.

For example, in article 700, uprights 704a of support element 704 and electrode support 716 are advantageously hinged to substrate 708. To assemble article 700, the uprights and electrode support are rotated out of plane either "actively" (e.g., using electrostatic actuators) or passively (e.g, using stressed layers that contract on release). Forming such hinged plates is known in the art. See, Pister et al., "Microfabricated Hinges," vol. 33, Sensors and Actuators A, pp. 249–56, 1992. See also assignee's co-pending patent applications MICRO MACHINED OPTICAL SWITCH, filed May 15, 1997 as Ser. No. 08/856569; METHODS AND APPARATUS FOR MAKING A MICRODEVICE, filed May 15, 1997 as Ser. No. 08/056565, and SELF-ASSEMBLING MICRO-MECHANICAL DEVICE, filed Dec. 22, 1977 as Ser. No. 08/997175, all of which applications are incorporated by reference herein.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An article comprising a deformable mirror, said deformable mirror comprising:

a plurality of linked mirror elements, wherein said mirror elements are physically separated from adjacent mirror elements such that said linked mirror elements define a segmented surface; and a plurality of linkages that mechanically link adjacent mirror elements to one another.

2. The article of claim 1 wherein, in response to an actuating force, said segmented surface deforms.

3. The article of claim 1 wherein said mirror elements are electrically conductive and said linkages are electrically conductive.

4. The article of claim 3 further comprising an electrode, wherein said plurality of linked mirror elements are disposed in spaced, opposed relation to said electrode.

5. The article of claim 4 further comprising a controlled voltage source for applying a voltage across said deformable mirror and said electrode.

6. The article of claim 5 further comprising a first optical fiber that is in optical communication with at least of said mirror elements.

7. The article of claim 5 further comprising a support by which said plurality of linked mirror elements are spaced from said electrode.

8. The article of claim 1 wherein a mechanical response of said plurality of linked mirror elements is isotropic.

9. The article of claim 1 wherein said mechanical response of each linkage is substantially identical to said mechanical response of every other linkage.

10. The article of claim 1 wherein a mechanical response of said plurality of linked mirror elements is anisotropic.

11. The article of claim 1 wherein a mechanical response of some of said linkages is different than said mechanical response of other of said linkages.

12. The article of claim 1 wherein each of said linkages comprises:

a first side member that depends, at a first end thereof, from one of said mirror elements;

a second side member that depends, at a first end thereof, from a mirror element that is adjacent to said one mirror element; and a v-shaped portion that depends from a second end of said first side member and a second end of said second side member thereby mechanically connecting said first side member to said second side member.

13. The article of claim 1 wherein a single linkage mechanically connects two mirror elements.

14. The article of claim 1 wherein four linkages depend from at least some of said mirror elements thereby mechanically connecting each of those mirror elements to four other mirror elements.

* * * * *